US005442345A

United States Patent [19]

Kwon

[11] Patent Number: 5,442,345

[45] Date of Patent: Aug. 15, 1995

[54] LOW VOLTAGE ALERTING DEVICE IN A PAGING RECEIVER AND METHOD THEREFOR

[75] Inventor: Won-Hyoun Kwon, Suwon, Rep. of Korea

[73] Assignee: SamSung Electronics Co., Ltd., Suwon, Rep. of Korea

[21] Appl. No.: 354,147

[22] Filed: Dec. 6, 1994

Related U.S. Application Data

[63] Continuation of Ser. No. 892,925, Jun. 3, 1992, abandoned.

[30] Foreign Application Priority Data

Nov. 26, 1991 [KR] Rep. of Korea ............... 21266/1991

[51] Int. Cl.[6] ......................... G08B 21/00; H04Q 7/00

[52] U.S. Cl. ........................... 340/825.46; 340/825.44; 340/663; 340/636; 455/38.3

[58] Field of Search ....................... 340/825.44, 825.46, 340/636, 663; 455/343, 38.3

[56] References Cited

U.S. PATENT DOCUMENTS

| | | | |
|---|---|---|---|
| 4,392,135 | 7/1983 | Ohyagi | 340/825.44 |
| 4,479,261 | 10/1984 | Oda et al. | 340/825.44 |
| 4,660,027 | 4/1987 | Davis | 340/636 |
| 4,755,816 | 7/1988 | De Luca | 340/825.44 |
| 5,032,825 | 7/1991 | Kuznicki | 340/636 |
| 5,095,308 | 3/1992 | Hewitt | 340/825.44 |
| 5,140,310 | 8/1992 | De Luca et al. | 340/636 |
| 5,265,271 | 11/1993 | Marko et al. | 455/343 |

*Primary Examiner*—Donald J. Yusko
*Assistant Examiner*—Edward Merz
*Attorney, Agent, or Firm*—Robert E. Bushnell

[57] ABSTRACT

A paging receiver with a motor and buzzer for saving a battery voltage by alerting a low voltage state of the battery. A low voltage detector compares the battery voltage with a reference voltage to generate a low voltage detection signal when the battery voltage is less than the reference voltage. In this case, an alerting driver is switched by the low voltage detection signal for cutting off the electrical passage between a motor and the battery and connecting the tone generator to the buzzer so as to generate alert tone.

21 Claims, 6 Drawing Sheets

LOW VOLTAGE ALERTING DEVICE IN A PAGING RECEIVER AND METHOD THEREFOR

This is a continuation of application Ser. No. 07/892,925, filed 3 Jun. 1992, now abandoned.

BACKGROUND OF THE INVENTION

The present invention relates to a device and method for generating alerting signals in a memory mode of a paging receiver when the battery of the paging receiver is a in low voltage state.

Generally, a paging receiver produces alerting signals indicative of the fact the same paging receiver is called, when receiving message data. The alerting signals are produced in the forms of an audible tone and vibration in normal and memory modes, respectively, as desired by a user. Referring to FIG. 1 in a conventional paging receiver, the user may set the paging receiver to the normal or memory mode through a switching circuit 115. A mode signal detector 114 transfers a normal mode signal or a memory mode signal to a controller 110 according to a selected mode.

The controller 110 periodically analyzes data received through a radio frequency (RF) receiver 121 so as to check out self data. Receiving the self data in the normal mode, the controller 110 stores the received self data into an internal memory and notifies the user of the call via a display 116 and a buzzer 118. However, if the controller 110 detects in memory mode the self data by analyzing the data received via the RF receiver 121, the controller 110 stores the self data into the internal memory, driving the display 116 and a motor 120, so as to notify the user of the call. In this case, the buzzer 118 is not driven.

A voltage detector 113 checks out a voltage state of the battery 11 for supplying power to the paging receiver, so as to generate a low voltage detection signal applied to the controller 110 when the battery voltage is in a low level. In this case, the controller 110 drives the buzzer 118 or motor 120 according to whether the normal mode or memory mode is selected.

In such a conventional paging receiver, the controller 110 periodically drives the motor 120 or buzzer 118 according to the selected mode even when the battery voltage is in the low level, thus accelerating the voltage consumption of the battery. Particularly in the memory mode, the motor 120 is periodically driven regardless of the voltage level of the battery, the excessive current for abruptly driving the motor 120 possible resulting in a sudden voltage drop of the battery so as to cause the initialization of the controller 110, so that it may be impossible to receive data as well as delete the data stored in the internal memory.

In order to resolve such problems there is proposed a method in U.S. Pat. No. 4,755,816 issued Jul. 5, 1988 to Motorola wherein if the voltage level of the battery is checked out to be insufficient before driving the alert device, the tone level of the alert device for notifying the user of the call is decreased in order to save the battery power.

However, in this prior art, the alert device is driven whenever the self data is received, and the voltage level of the battery is gradually decreased even though the self data is not received, so that it is impossible to detect the precise moment at which the voltage of the battery reaches the low level. Moreover, since the level of the alerting tone is adjusted at the moment when the self data is received, it is impossible for the user to exactly perceive that the voltage of the battery is in the low level.

SUMMARY OF THE INVENTION

It is an object of the present invention to provide a device and method for immediately producing an alerting signal so as to notify the user of the low voltage state of the battery in the memory mode of a paging receiver.

It is another object of the present invention to provide a device and method for saving the voltage of a battery used in a paging receiver by detecting low voltage levels of the battery through a plurality of detectors and sequentially controlling alerting devices in response to the low voltage level detection.

It is a further object of the present invention to provide a device and method for preventing a paging receiver from being initialized when the voltage level of the battery reaches a low state in a paging receiver.

According to an aspect to the present invention, a paging receiver comprises a battery for providing power source, a tone generator for generating a tone signal, a low voltage detector for generating a low voltage detection signal by detecting the voltage level of the battery, and an alerting driver switched by the low voltage detection signal for cutting off the electrical passage between a motor and the battery and connecting the tone generator to a buzzer so as to generate an alert tone.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF A CERTAIN PREFERRED EMBODIMENT

Figure 1:
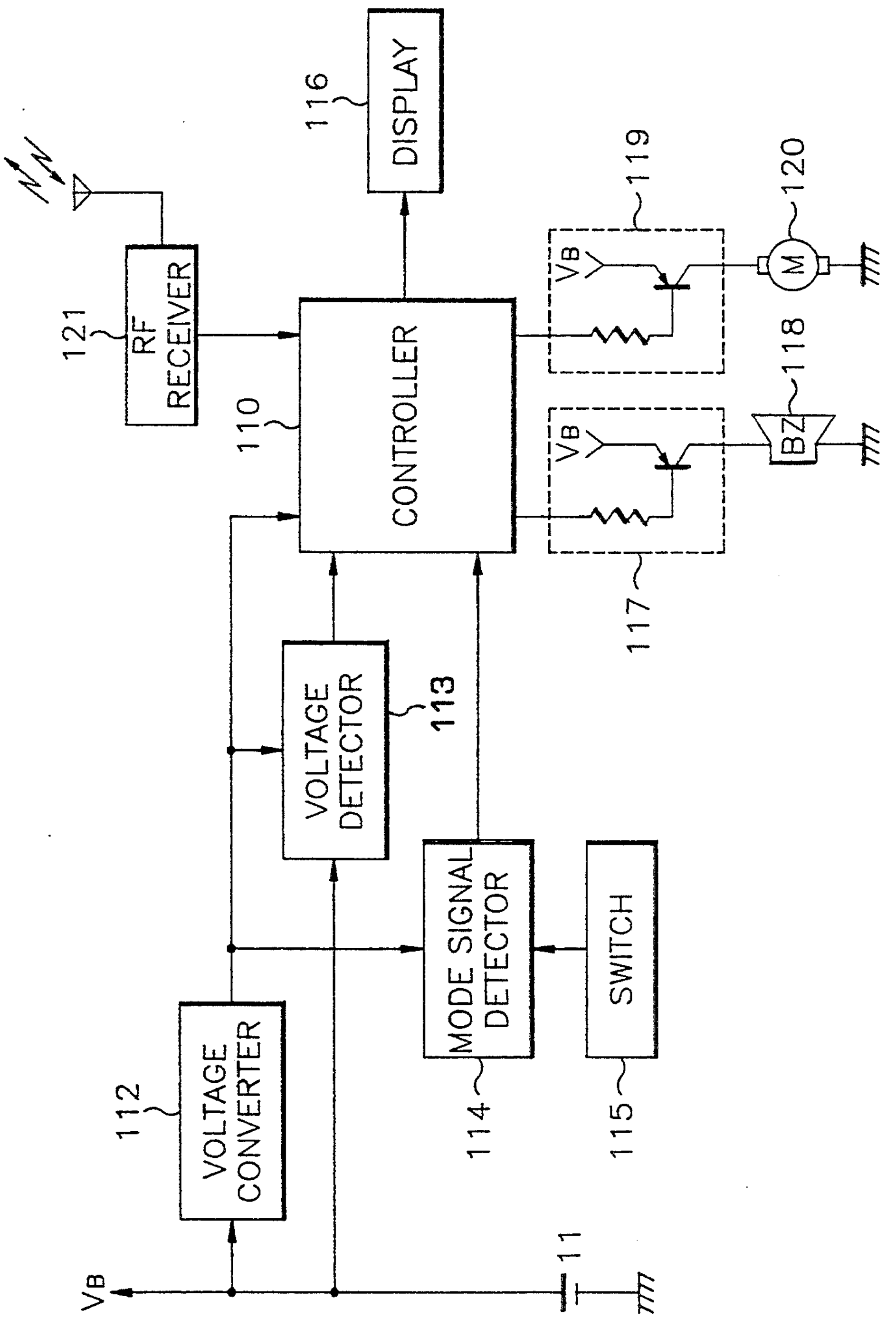
(PRIOR ART) FIG. 1
FIG. 1 is a block diagram for illustrating a low voltage alerting circuit according to the prior art.
Figure 2:
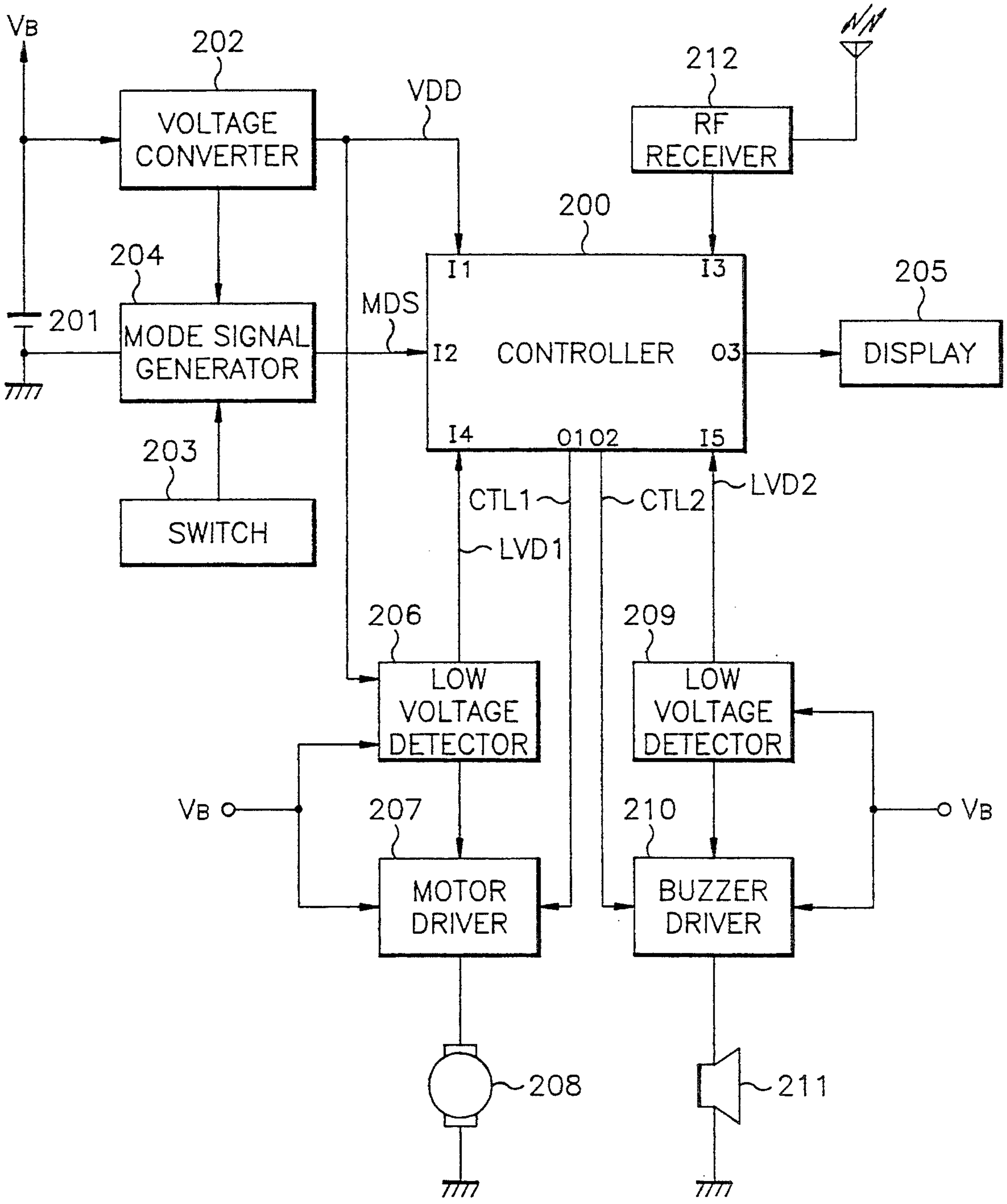
FIG. 2 is a block diagram for illustrating a low voltage alerting circuit according to the present invention.

Referring to FIG. 2, a battery 201, with the negative terminal grounded provides a voltage VB, and a voltage converter 202 is to DC-DC convert the voltage VB so as to generate a operating voltage VDD applied to the elements of a paging receiver. A switch circuit 203 selects a normal mode or a memory mode. A mode signal generator 204 has a control terminal connected to the output of the switch circuit 203, a first terminal connected to the operating voltage VDD and a second terminal grounded. The mode signal generator 204 generates the operating voltage VDD or ground voltage in response to a mode selection signal from the switch circuit 203. An RF receiver 212 demodulates and shapes RF signals received via an antenna connected thereto.

A controller 200 may be a single chip microprocessor with a tone oscillation function, which has first to fifth input terminals I1–I5 and first to third output terminals O1–O3. In this case, the first input terminal I1 is connected with the operating voltage VDD of the voltage converter 202, the second input terminal I2 with the mode selection signal MDS of the mode signal generator 204, the third input terminal I3 with the output terminal of the RF receiver 212, the fourth input terminal I4 with the output signal LVD1 of a first low voltage detector 206, and the fifth input terminal I5 with the output signal LVD2 of a second low voltage detector 209. The first to third output terminals O1, O2 and O3 are to generate a first control signal CTL1 for controlling a motor 208, a second control signal CTL2 for controlling the tone generation of a buzzer 211, and data for displaying the present state of the paging receiver, respectively. The controller 200 sets an alerting mode in response to the mode selection signal MDS received via the second input terminal I2, analyzes and stores the data received via the input terminal I3, and generates the first or second control signal CTL1 or CTL2 and the signal for displaying messages. Thus, upon receiving a first low voltage detection signal LVD1 via the fourth input terminal I4 in the memory mode, the controller 200 cuts off the motor drive signal CTL1, drives an internal tone generator to generate an audible alerting data as the tone control signal CTL2 indicative of the low voltage state via the second output terminal O2, and generates low voltage display data for displaying low voltage via the third output terminal O3. Further, upon receiving the second low voltage detection signal LVD2 via the fifth input terminal I5 in the memory mode, the controller 200 cuts off the motor drive signal CTL1 via the first output terminal O1 and the tone control signal CTL2 via the second output terminal O2, while generating the low voltage display data via the third output terminal O3 to a display circuit 205.

The first low voltage detector 206 compares the output voltage VB of the battery 201 with a first reference voltage Vref1, and generates the first low voltage detection signal LVD1 applied to the fourth input terminal I4 of the controller 200 when the battery voltage VB is less than the first reference voltage Vref1. A motor driver 207 is connected between the first low voltage detector 206 and motor 208, receiving the battery voltage VB in order to drive the motor 208, and is switched to cut off the battery voltage VB when the controller 200 disables the motor drive signal CTL1 in response to the first low voltage detection signal LVD1 of the first low voltage detector 206. The motor 208 is vibrated by receiving the battery voltage VB via the motor driver 207.

The second low voltage detector 209 compares the voltage battery VB with a second reference voltage Vref2, and generates the second low voltage detection signal LVD2 applied to the fifth input terminal I5 of the controller 200 when the battery voltage VB is less than the second reference voltage Vref2. A buzzer driver 210 is connected between the second low voltage detector 209 and buzzer 211, receiving the battery voltage VB to generate a tone switching signal according to the state of the tone control signal CTL2, and switched to cut off the battery voltage VB when the controller 200 disables the tone control signal CTL2 in response to the second low voltage detection signal LVD2 of the second low voltage detector 209. The buzzer 211 rings by receiving the battery voltage VB through the buzzer driver 210.

Display circuit 205 is connected to the third output terminal O3 of the controller 200 so as to display various messages that the controller 200 generates according to the states of the paging receiver.

Figure 3A:
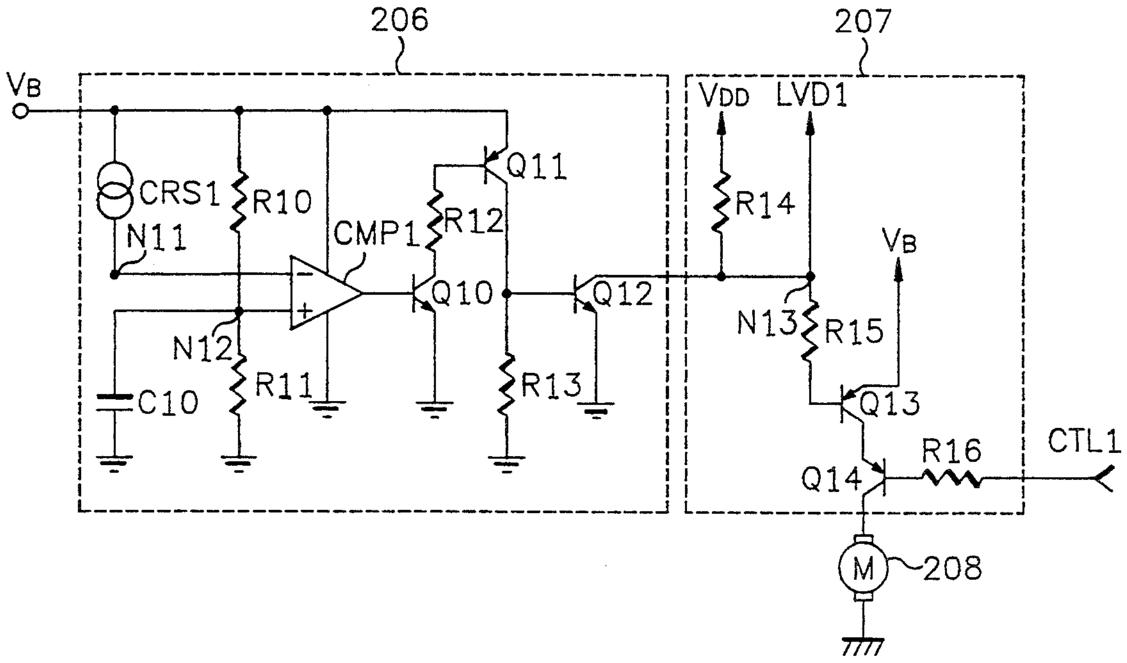
FIGS. 3A and 3B are detailed diagrams of low voltage detectors and drivers of FIG. 2.

The first low voltage detector 206, motor driver 207 and motor 208 of FIG. 2 are specifically shown in FIG. 3A. The first low voltage detector 206 includes a first constant current source CRS1 connected between the battery voltage VB and node N11 to generate the first reference voltage signal Ref1 for determining whether the motor is to be driven or not. A resistor R10 is connected between the battery voltage VB and node N12, and a resistor R11 and capacitor C10 are connected in parallel between the node N12 and ground. The battery voltage VB is divided through the resistors R10 and R11 and capacitor C10, generating a comparing voltage, which represents the present voltage level of the battery voltage VB applied to the node N13. The nodes N11 and N12 are respectively connected with the reference and comparing terminals of a comparator CMP1 that compares the comparing voltage of the node N12 with the reference voltage Ref1 of the node N11 so as to generate a signal to indicate whether the low voltage is detected or not. The comparator CMP1 generates a signal of logic "high" when the reference voltage signal Ref1 is less than the comparing signal, and a signal of logic "low" when the reference voltage signal Ref1 is greater than the comparing signal. Transistors Q10–Q12 and resistors R12–R13 are switched according to the signal from the comparator CMP1, that is, the first low Voltage detector 206 generates the first low voltage detection signal LVD1 of "low" level when the comparator CMP1 produces a "high" signal, and the first low voltage detection signal LVD1 of "high" level when the comparator CMP1 produces a "low" signal.

The motor driver 207 includes a resistor R14 connected between the supply voltage VDD and first low voltage detector 206 to generate the first low voltage detection signal LVD1 in the level of the supply voltage VDD at node N13. The first low voltage detection signal LVD1 is applied to the fourth input terminal I4 of the controller 200. A transistor Q13 has an emitter connected with the battery voltage VB, a base connected to the node N13 via a resistor 15 so as to cut off the supplying of the battery voltage VB when there is generated the first low voltage detection signal LVD1. A transistor Q14 has an emitter connected with the collector of the transistor Q13, a collector connected with the motor 208, and a base connected with the motor control signal CTL1 vial a resistor R16, so as to cut off the supplying of the battery voltage VB to the motor 208 when there is generated the first control signal CTL1.

Figure 3B:
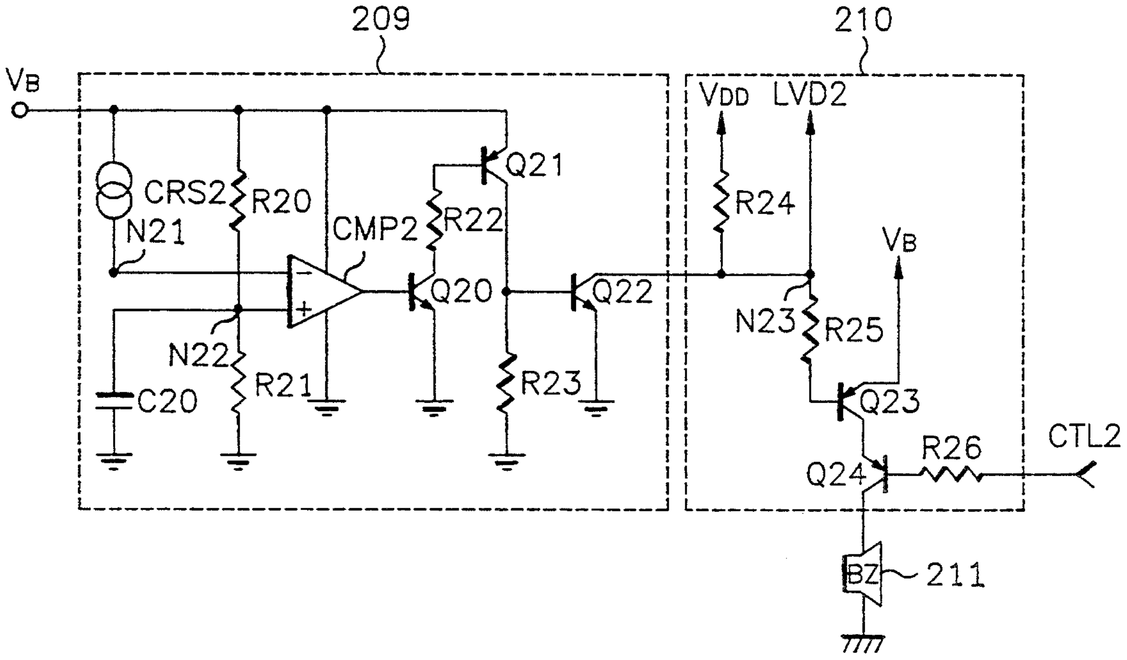

FIG. 3B specifically illustrates the circuit for connecting the second low voltage detector 209, buzzer driver 210 and buzzer 211, which is similar to that shown in FIG. 3A.

Hereinafter, the operation of the device according to the present invention will now be described in detail with reference to FIGS. 2, 3A to 3B, 4A to 4E, 5 and 6A to 6B.

Figure 6A:
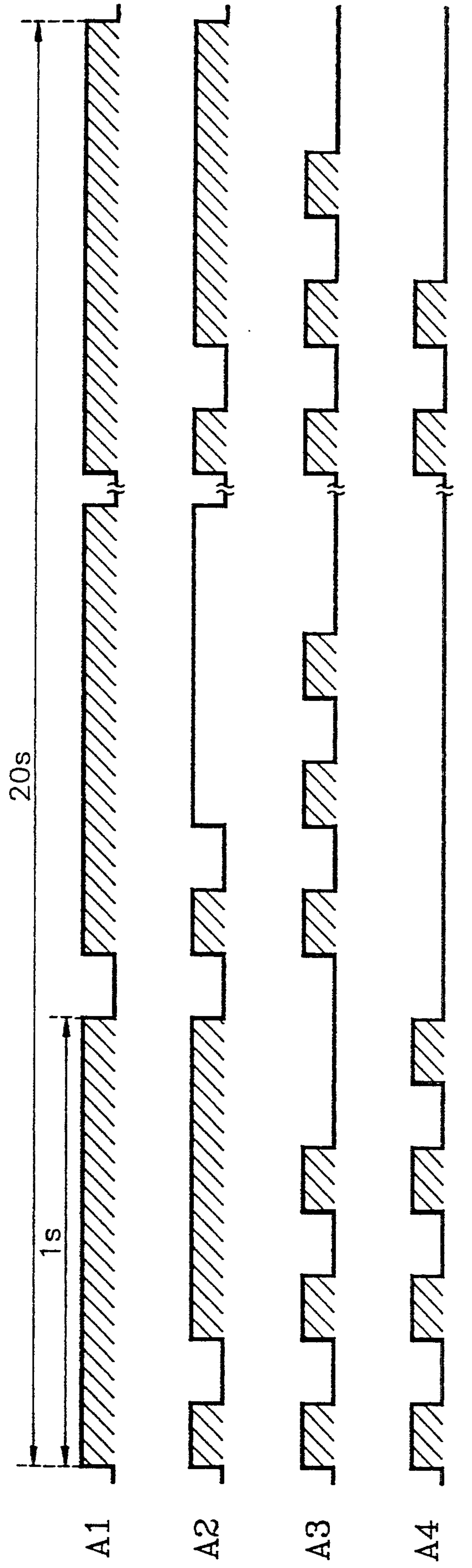
FIG. 6 shows the timing diagrams of tone data.
Figure 6B:
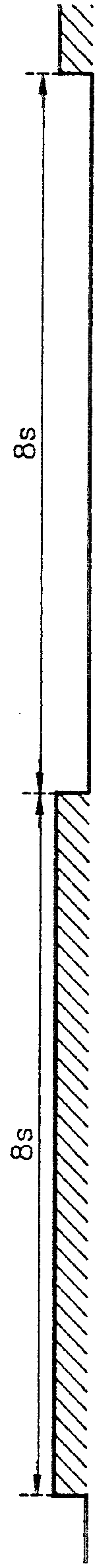

Tone data as shown in FIGS. 6A and 6B are stored in a ROM (read only memory) of the controller 200. Upon receiving self data, the controller 200 generates any of the tone data A1–A4 as shown in FIG. 6A through the second output terminal O2, thus producing an alerting tone. There also may be stored in the ROM the tone data for producing the alerting tone indicating the low voltage detection, which tone is assumed to be turned on and off by on/off periods of 8 seconds, as shown FIG. 6B.

The controller 200 recognizes whether one of the normal and memory modes is selected by the switch circuit 203 according to the mode selection signal MDS generated by the mode signal generator 204. The first and second low voltage detectors 206 and 209 check whether the voltage VB of the battery 201 is in a low state, thereby generating the state signal to the controller 200.

Figures 4A, 4B, 4C, 4D, 4E:
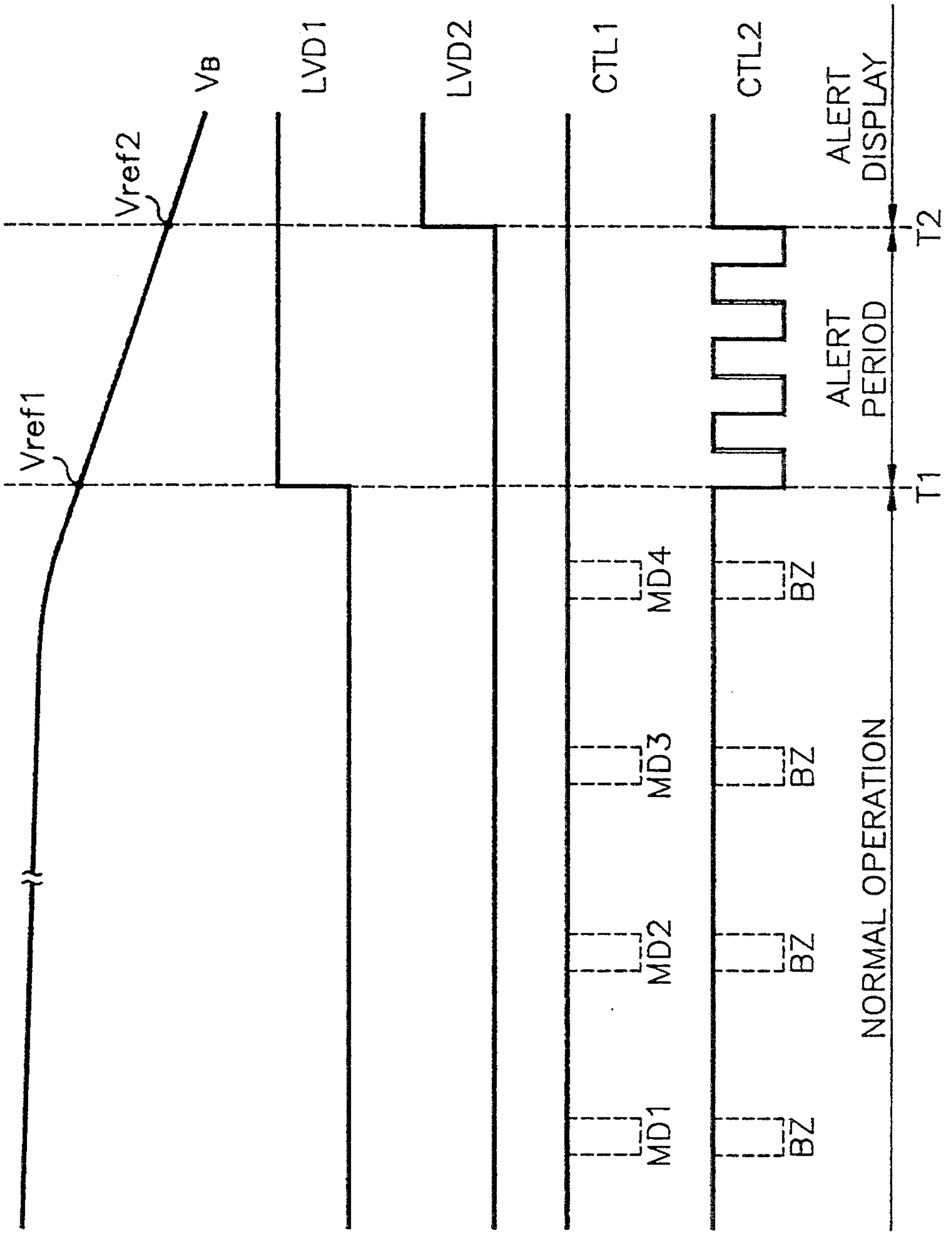
FIG. 4A–4E show the operational waveforms of FIGS. 2 and 3A and 3B.

Firstly, in the memory mode, the comparator CMP1 of the first low voltage detector 206 compares the battery voltage VB with the first reference voltage Vref1 detected via the node N11 so as to produce the signal of logic "high" when the battery voltage VB is greater than the first reference voltage Vref1. Then the transistors Q10–Q12 are turned on to produce the first low voltage detection signal LVD1 of logic "low" as shown in FIG. 4B via the node N13. Thus, the controller 200 receives the first low voltage detection signal LVD1 through the fourth input terminal I4, which signal indicates the drive signal of the motor 208. Since the second reference voltage Vref2 of the second low voltage detector 209 is set to be lower than the first reference voltage Vref1, the second low voltage detector 209 generates the second low voltage detection signal LVD2 of logic "low". In this case, a transistor Q23 of the buzzer driver 210 is turned on, thus connecting the battery voltage VB to the buzzer 211.

When the battery voltage VB is at a normal level, if the controller 200 receives the self data by analyzing the data received via the RF receiver 212, the controller 200 generates the motor drive signal CTL1 as shown in FIG. 4D to the motor driver 207. Namely, whenever the controller 200 receives the self data, the controller 200 transfers the motor drive signal CTL1 of logic "low" as shown by MD1 to MD4 in FIG. 4 to the motor driver 207. Then the motor driver 207 supplies the battery voltage VB to the motor 208 because the transistor Q13 is turned on and the transistor Q14 is also turned on, so that the motor 208 is vibrated, notifying the user of the fact that messages are received.

However, if the battery voltage VB becomes lower than the reference voltage Vref1 at time T1, the comparator CMP1 of the first low voltage detector 206 produces the signal of logic "low". Then, the transistors Q10–Q12 are turned off so as to produce the first low voltage detection signal LVD1 of logic "high" as shown in FIG. 4B to the node N13, so that the transistor Q13 of the motor driver 207 is turned off, thus cutting off the battery voltage VB to the motor 208. Upon receiving the first low voltage detection signal LVD1 of logic "high", the controller 200 generates the motor drive control signal CTL1 of logic "high" as shown in FIG. 4D, so that the transistor Q14 of the motor driver 207 is turned off so as to cut off the battery voltage VB to the motor 208. Accordingly, if the first low voltage is detected in the memory mode, the motor 208 is not driven even when the self data is received.

Furthermore, since the second reference voltage Vref2 of the second low voltage detector 209 is set to be lower than the first reference voltage Vref1 (Vref1>Vref2), the comparator CMP2 of the second low voltage detector 209 produces the signal of logic "high" and the transistors Q20–Q22 are turned on so as to produce the second low voltage detection signal LVD2 of logic "low" as shown in FIG. 4C to the node N23, thus turning on the transistor Q23 of the buzzer driver 210 so as to connect the battery voltage VB to the buzzer 211.

That is, the controller 200 receives the first low voltage detection signal LVD1 of logic "high" as shown in FIG. 4B through the fourth input terminal I4 and the second low voltage detection signal LVD2 of logic "low" as shown in FIG. 4C through the fifth input terminal I5, so that the controller 200 recognizes the detection of the first low voltage, cuts off the motor drive signal CTL1, as shown in FIG. 4D, and generates the tone control signal CTL2, as shown in FIG. 4E, through the second output terminal O2 by accessing the low voltage alerting tone data as shown in FIG. 6B stored in the internal ROM. The transistor Q24 of the buzzer driver 210 is switched on/off by the tone control signal CTL2 as shown in FIG. 6B to provide the battery voltage VB to the buzzer 211, thereby generating the alerting tone indicating the low voltage state of the battery.

The alerting tone indicating the low voltage state of the battery as shown in FIG. 6B is different from the alerting tone of FIG. 6A generated when the messages are received, so as to make it possible to easily recognize the low voltage state of the battery 201 In this case, the display circuit 205 displays the message of "LOLOLO . . . " indicating the low voltage state of the battery 201. Moreover, since the buzzer 211 is driven instead of the motor 208, the power consumption of the battery 201 is decreased (the current required for driving the buzzer is about 40 to 50 milli-ampere, compared to the driving of the motor 208 which requires 100 to 150 milli-ampere (mA)), so that the abrupt resetting of the controller 200 is prevented. Hence, the erasing of the stored information is prevented, and it is possible to precisely analyze the data received via the RF receiver 212.

If the battery 201 is not changed in the first low voltage state as shown by T1–T2 in FIGS. 4A to 4E, the battery voltage VB decreases even more as shown in FIG. 4A. Thus, if the battery voltage VB becomes lower than the second reference voltage Vref2 at time T2 of FIG. 4A, the comparator CMP2 of the second low voltage detector 209 produces the signal of logic "low" so that the transistors Q20–Q22 are turned off so as to produce the second low voltage detection signal LVD2 of logic "high" as shown in FIG. 4C. Consequently, the transistor Q23 of the buzzer driver 210 is turned off, thus cutting off the battery voltage VB to the buzzer 211.

Upon receiving the first and second low voltage detection signals LVD1 and LVD2 of logic "high" as shown in FIGS. 4B and 4C, respectively, via the fourth and fifth input terminals I4 and I5, the controller 200 recognizes the dropping of the battery voltage VB below the second low voltage state so as to cut off the motor drive signal CTL1 and the tone control signal CTL2 as shown in FIGS. 4D and 4E, respectively. Hence, the power consumption by the motor 208 and buzzer 211 is prevented so that the output voltage VB of the battery 201 is maintained at a maximum value to prevent the resetting of the controller 200 and to detect the data received in the low voltage state. In this case, the controller 200 keeps on controlling the display circuit 205 to display the message of "LOLOLO . . . " indicating the low voltage state.

Consequently, in the memory mode, when the battery voltage is at the normal level, the motor 208 is normally driven so as to indicate the message reception state whenever the self data is received. When the battery voltage is lower than the first reference voltage Vref1, the motor 208 is not driven, to prevent the abrupt consumption of battery voltage and the state of the low voltage is recognized by the alerting tone of the buzzer 211. When the battery voltage is lower than the second reference voltage Vref2, both the motor 208 and the buzzer 211 are not driven and the state of the low voltage is displayed only by the display circuit 205. In this case, if the self message is received in the low voltage state, the controller 200 stores the message into the internal memory thereof without the alerting tone.

Meanwhile, in the normal mode for driving the buzzer 211, the controller 200 maintains the motor drive signal CTL1 to be always cut off, so that the transistor Q14 of the motor driver 207 is turned off so as to cut off the battery voltage VB to the motor 208 even when the first low voltage detection signal LVD1 is in "low" state. Hence, the motor 208 is maintained stopped.

Upon receiving the first low voltage detection signal LVD1 of logic low the controller 200 analyzes the data received by the RF receiver 212. If the data is the self data, the controller 200 performs the access operation of the tone data as shown in FIG. 6A from the ROM, which tone data is transferred through the second output terminal O2 as the tone control signal CTL2, at a period as shown by BZ of FIG. 4E. Then the transistor Q24 of the buzzer driver 210 is switched on/off by the tone control signal CTL2 so as to apply the battery voltage VB to the buzzer 211 to produce the alerting tone indicating the reception of the message.

In this case, if the first low voltage detector 206 generates the first low voltage detection signal LVD1 of logic "high" as shown in FIG. 4B at time T1, the controller 200 produces the tone control signal CTL2 as shown in FIG. 6B for indicating the low voltage state via the second output terminal O2. Then the buzzer driver 210 drives the buzzer 211 in response to the tone control signal CTL2, as shown in FIG. 4E, thus indicating the low voltage state. Thereafter, if the second low voltage detector 209 produces the second low voltage detection signal LVD2 of logic "high" as shown in FIG. 4C at time T2, the controller 200 cuts off the motor drive control signal CTL1 and the tone control signal CTL2 as shown in FIGS. 4D and 4F, and only displays the low voltage state on the display circuit 205.

Figure 5:
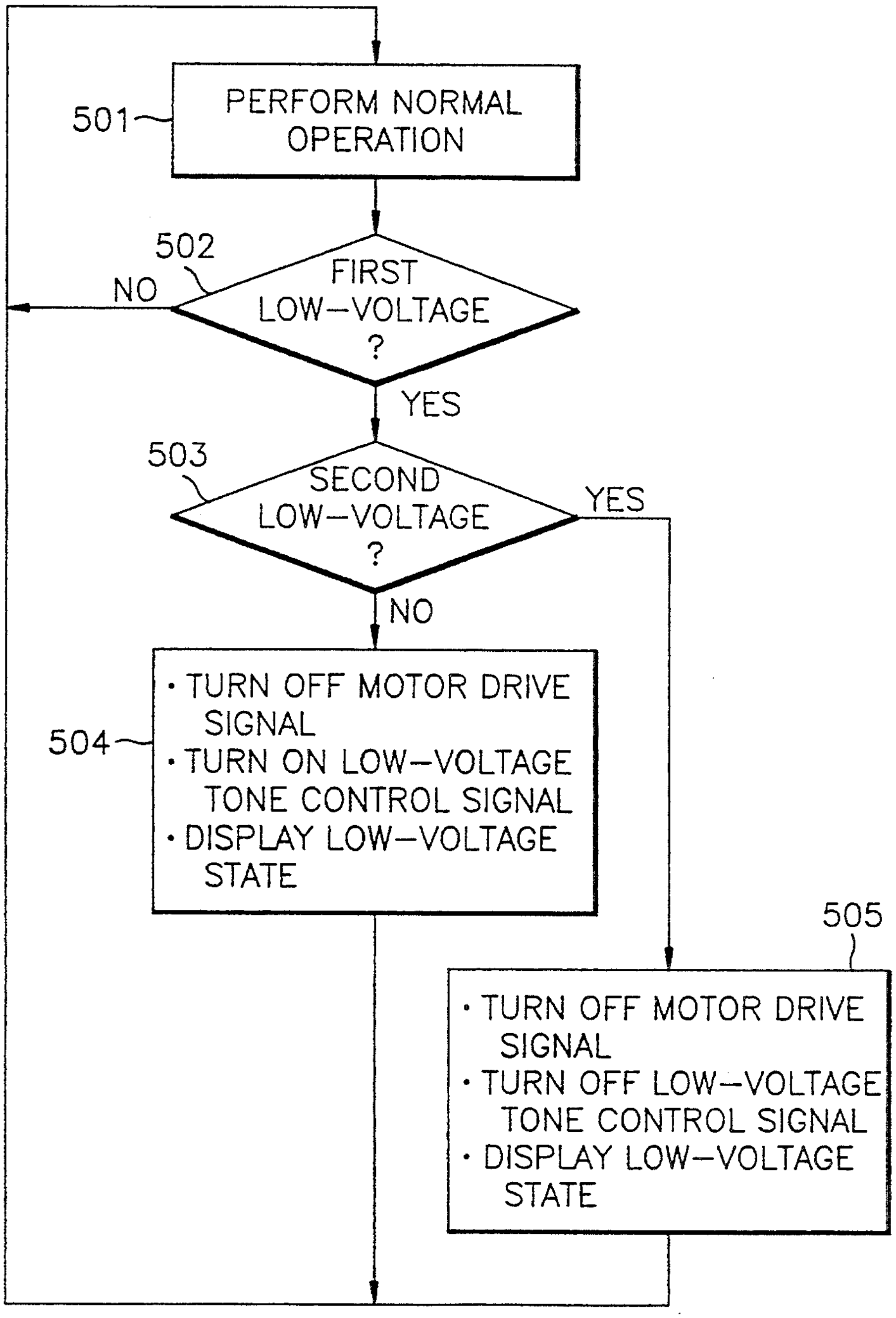
FIG. 5 is a flow chart for illustrating an alert driving operation according to the present invention.

The above operating steps will now be summarized with reference to FIG. 5. Firstly, while receiving the first and second low voltage detection signals LVD1 and LVD2 in the normal state (LVD1=LVD2=logic "low") in step 501, the controller 200 analyzes the data received via the RF receiver 212 so as to perform the normal function of the paging receiver by driving the motor 208 or buzzer 211 according to whether the paging receiver is set to the memory or normal mode, respectively. Meanwhile, the controller 200 checks the fourth input terminal I4 periodically, for example in period of 125 milli-seconds, in order to detect the first low voltage state (LVD1=logic "high") in step 502. If not detecting the first low voltage, the controller returns to step 501 to control the normal operation of the paging receiver. However, if detecting the first low voltage in step 502, the controller 200 checks the state of the fifth input terminal I5 in step 503 in order to detect the second low voltage state (LVD2=logic "high"). If not detecting the second low voltage in the step 503 (LVD1=logic "high", LVD2=logic "low"), the controller 200 cuts off the motor drive control signal CTL1 in step 504 while producing the low voltage tone control signal CTL2 to drive the buzzer 211, and displays; the low voltage state on the display circuit 205. Finally, if detecting the second low voltage in step 503 (LVD1=LVD2 =logic "high"), the controller 200 cuts off both the motor drive control :signal CTL1 and the tone control signal CTL2 so as to stop the motor 208 and buzzer 211, and only displays the low voltage state on the display circuit 205.

In the above circuit, S-8051ANR or S-8051ANB available from the Seiko of the Japanese Company may be used as the first and second voltage detectors 206 and 209, wherein the first and second reference voltages Vref1 and Vref2 may be set to +1.2 to +1.1 Volts and +1.1 to +1.0 Volts, respectively.

As stated above, the paging receiver according to the present invention may produce an alerting tone indicating the low voltage state of the battery, and sequentially stops the motor and buzzer according to the low voltage state of the battery, so that the life of the battery may be prolonged, and the resetting of the controller and the erasing of the stored message due to the abrupt power consumption may be prevented.

While the invention has been particularly shown and described with reference to a preferred embodiment, it will be understood by those skilled in the art that modifications in detail may be made without departing from the spirit and scope of the invention.

What is claimed is:

1. A low voltage alerting circuit in a paging receiver for driving vibrating means in response to received self data in a memory mode, said low voltage alerting circuit comprising:

power supply means for providing a power supply voltage;

low voltage detector means connected to controller means, for generating a first low voltage detection signal independently of reception of said self data by said paging receiver whenever said power supply voltage is less than a first reference voltage, and a second low voltage detection signal independently of reception of said self data by said paging receiver whenever said power supply voltage is less than a second reference voltage lower than said first reference voltage;

alerting driver means interposed between said power supply means and said low voltage detector means, for sequentially disconnecting electrical conduction between said power supply means and said vibrating means, and between said power supply means and buzzer means in dependence upon said first and second low voltage detection signals, respectively; and said controller means for enabling a visual display of low voltage status of said power supply means in dependence upon said first and second low voltage detection signals, and said buzzer means for producing a first audible tone scheme comprised of audible tones each having a first time duration to alert a user of the low voltage status of said power supply means in response to said first low voltage detection signal and for producing a second audible tone scheme comprised of audible tones each having a second time duration to alert the user of the reception of said self data, said first time duration being different than said second time duration.

2. The low voltage alerting circuit as claimed in claim 1, wherein said low voltage detector means comprises:

first low voltage detector means for comparing said power supply voltage with said first reference voltage so as to generate said first low voltage detection signal when said power supply voltage is less than said first reference voltage; and second low voltage detector means for comparing said power supply voltage with said second reference voltage to generate said second low voltage detection signal when said power supply voltage is less than said second reference voltage; and wherein said alerting driver means comprises:

first driver means connected with said first low voltage detector means, for cutting off electrical connection between said vibrating means and said power supply means in response to said first low voltage detection signal, while maintaining electrical conduction between said buzzer means and said power supply means to drive said buzzer means to alert a user of the low voltage status of said power supply means;

second driver means connected with said second low voltage detector means, for cutting off electrical connection between said buzzer means and said power supply means in response to said second low voltage detection signal to disable said buzzer means from alerting the user of the low voltage status of said power supply means.

3. The low voltage alerting circuit as claimed in claim 2, further comprising display means for displaying said low voltage status of said power supply means when one of said first low voltage detection signal and said second low voltage detection signal is applied to said controller means.

4. The low voltage alerting circuit as claimed in claim 3, wherein said buzzer means, said vibrating means and said power supply means are a buzzer, a motor and a battery, respectively.

5. A low voltage circuit for conserving a battery voltage of a battery in a paging receiver having vibrating means and buzzer means, wherein said paging receiver drives said vibrating means during a first mode, said low voltage circuit comprising:

low voltage detector means for comparing said battery voltage with a first reference voltage to generate a first low voltage signal whenever said battery voltage is less than said first reference voltage, and for comparing said battery voltage with a second reference voltage to generate a second low voltage signal whenever said battery voltage is less than said second reference voltage, said low voltage detector means performing said comparisons independently of reception of a paging message by said paging receiver;

driver means for cutting off said battery voltage from said vibrating means in response to said first low voltage signal, and for cutting off said battery voltage from said buzzer means in response to said second low voltage signal; and control means for cutting off said battery voltage from said vibrating means and transmitting a warning tone signal to said driver means to drive said buzzer means to generate a first audible tone sequence comprised of audible tones each having a first time duration in response to receipt of said first low voltage signal, and for cutting off said battery voltage from said buzzer means in response to receipt of both of said first low voltage signal and said second low voltage signal, said buzzer means generating a second audible tone sequence comprised of audible tones each having a second time duration unequal to said first time duration in response to the reception of said paging message by said paging receiver.

6. The low voltage circuit as claimed in claim 5, wherein said low voltage detector means further comprises:

first detector means for making said comparison between said battery voltage and said first reference voltage, to generate said first low voltage signal; and second detector means for making said comparison between said battery voltage and said second reference voltage, to generate said second low voltage signal.

7. The low voltage circuit as claimed in claim 6, wherein said driver means comprises:

vibrating driving means for cutting off said battery voltage from said vibrating means in response to said first low voltage signal, and for driving said vibrating means in response to a first control signal generated by said control means; and buzzer driving means for cutting off said battery voltage from said buzzer means in response to said second low voltage signal, and for driving said buzzer means in response to a second control signal generated by said control means.

8. The low voltage circuit as claimed in claim 7, further comprising:

display means for generating a low voltage display when said control means receives one of said first low voltage signal and said second low voltage signal.

9. The low voltage circuit as claimed in claim 7, wherein during a second mode of the paging receiver, said control means permanently cuts off said battery voltage from said vibrating means and cuts off said battery voltage from said buzzer means in response to receipt of said second low voltage signal.

10. The low voltage circuit as claimed in claim 9, further comprising:

display means for generating a low voltage display when said control means receives one of said first low voltage signal and said second low voltage signal.

11. The low voltage circuit as claimed in claim 7, wherein said control means cuts off said battery voltage from said vibrating means in response to said first control signal transmitted to said vibrating driving means, and said control means cuts off said battery voltage from said buzzer means in response to said second control signal transmitted to said buzzer driving means.

12. The low voltage circuit as claimed in claim 7, wherein:

said vibrating driving means comprises:

first means for alternately enabling transmission of said battery voltage in response to said first low voltage signal, to generate a first transmitted voltage signal; and second means connected between said first means and said vibrating means for alternately enabling transmission of said first transmitted voltage signal to said vibrating means in response to said first control signal; and said buzzer driving means comprises:

third means for alternately enabling transmission of said battery voltage in response to said second low voltage signal, to generate a second transmitted voltage signal; and fourth means connected between said third means and said buzzer means for alternately enabling transmission of said second transmitted voltage signal to said buzzer means in response to said second control signal.

13. A method of generating a low voltage warning signal in a paging receiver, comprising:

making a first comparison between a battery voltage of the paging receiver and a first reference voltage independently of reception of a paging message by said paging receiver;

making a second comparison between said battery voltage and a second reference voltage lower than said first reference voltage independently of reception of said paging message by said paging receiver whenever said battery voltage is less than said first reference voltage;

cutting off electrical connection between said battery voltage and a motor, and generating a tone signal to drive a buzzer to generate a first audible tone sequence whenever said battery voltage is less than said first reference voltage and greater than said second reference voltage; and cutting off said electrical connection between said battery voltage and said motor, and cutting off electrical connection between said battery voltage and said buzzer whenever said battery voltage is less than said first reference voltage and said second reference voltage, said buzzer generating a second audible tone sequence that is audibly distinguishable from said first audible tone sequence in response to said reception of said paging message by said paging receiver.

14. The method as claimed in claim 13, further comprising the step of:

displaying a low voltage message on a display device if said battery voltage is less than said first reference voltage.

15. The low voltage alerting circuit as claimed in claim 2, wherein said first low voltage detector means comprises:

a comparator having a first terminal coupled to receive said power supply voltage via a current source, and a second terminal connected to ground via a capacitance, for providing a resultant signal by comparing said power supply voltage with said first reference voltage;

a first transistor having a first electrode of a principal electrically conducting channel coupled to receive said power supply voltage and a second electrode of said principal electrically conducting channel connected to ground via a first resistance;

a second transistor having a first electrode of a principal electrically conducting channel connected to a control electrode of said first transistor via a second resistance, and a second electrode of said principal electrically conducting channel connected to ground, and a control electrode coupled to receive said resultant signal; and a third transistor having a first electrode of a principal electrically conducting channel providing said first low voltage detection signal and a second electrode of said principal electrically conducting channel connected to ground, and a control electrode connected to said second electrode of said second transistor.

16. The low voltage alerting circuit as claimed in claim 15, wherein said first driver means comprises:

a fourth transistor having a first electrode of a principal electrically conducting channel coupled to receive said power supply voltage, and a control electrode coupled to respond to said first low voltage detection signal; and a fifth transistor having a first electrode of a principal electrically conducting channel connected to a second electrode of said fourth transistor, and a second electrode of said principal electrically conducting channel connected to said vibrating means, and a control electrode coupled to respond to said controller means.

17. The low voltage circuit as claimed in claim 5, wherein said low voltage detector means comprises:

a first comparator having a first terminal coupled to receive said power supply voltage via a first current source, and a second terminal connected to ground via a first capacitance, for providing a first resultant signal by comparing said power supply voltage with said first reference voltage;

a first transistor having a first electrode of a principal electrically conducting channel coupled to receive said power supply voltage and a second electrode of said principal electrically conducting channel connected to ground via a first resistance;

a second transistor having a first electrode of a principal electrically conducting channel connected to a control electrode of said first transistor via a second resistance, and a second electrode of said principal electrically conducting channel connected to ground, and a control electrode coupled to receive said first resultant signal;

a third transistor having a first electrode of a principal electrically conducting channel providing said first low voltage detection signal and a second electrode of said principal electrically conducting channel connected to ground, and a control electrode connected to said second electrode of said second transistor;

a second comparator having a first terminal coupled to receive said power supply voltage via a second current source, and a second terminal connected to ground via a second capacitance, for providing a second resultant signal by comparing said power supply voltage with said second reference voltage;

a fourth transistor having a first electrode of a principal electrically conducting channel coupled to receive said power supply voltage and a second electrode of said principal electrically conducting channel connected to ground via a third resistance;

a fifth transistor having a first electrode of a principal electrically conducting channel connected to a control electrode of said fourth transistor via a fourth resistance, and a second electrode of said principal electrically conducting channel connected to ground, and a control electrode coupled to receive said second resultant signal; and a sixth transistor having a first electrode of a principal electrically conducting channel providing said second low voltage detection signal and a second electrode of said principal electrically conducting channel connected to ground, and a control electrode connected to said second electrode of said fifth transistor.

18. The low voltage circuit as claimed in claim 5, wherein said driver means comprises:

a first transistor having a first electrode of a principal electrically conducting channel coupled to receive said power supply voltage, and a control electrode coupled to respond to said first low voltage signal;

a second transistor having a first electrode of a principal electrically conducting channel connected to a second electrode of said first transistor, and a second electrode of said principal electrically conducting channel connected to said vibrating means, and a control electrode coupled to respond to said control means;

a third transistor having a first electrode of a principal electrically conducting channel coupled to receive said power supply voltage, and a control electrode coupled to respond to said second low voltage signal; and a second transistor having a first electrode of a principal electrically conducting channel connected to a second electrode of said third transistor, and a second electrode of said principal electrically conducting channel connected to said buzzer means, and a control electrode coupled to respond to said control means.

19. The circuit as claimed in claim 5, wherein said detector means comprises:

a first comparator having a first terminal coupled to receive said battery voltage via a first current source, and a second terminal connected to ground via a first capacitance, for providing a first resultant signal by comparing the level of said battery voltage with said first reference voltage;

a first transistor having a first electrode of a principal electrically conducting channel coupled to receive said battery voltage and a second electrode of said principal electrically conducting channel connected to ground via a first resistance;

a second transistor having a first electrode of a principal electrically conducting channel connected to a control electrode of said first transistor via a second resistance, and a second electrode of said principal electrically conducting channel connected to ground, and a control electrode coupled to receive said first resultant signal;

a third transistor having a first electrode of a principal electrically conducting channel providing said first low voltage detection signal and a second electrode of said principal electrically conducting channel connected to ground, and a control electrode connected to said second electrode of said second transistor;

a second comparator having a first terminal coupled to receive said battery voltage via a second current source, and a second terminal connected to ground via a second capacitance, for providing a second resultant signal by comparing the level of said battery voltage with said second reference voltage;

a fourth transistor having a first electrode of a principal electrically conducting channel coupled to receive said battery voltage and a second electrode of said principal electrically conducting channel connected to ground via a third resistance;

a fifth transistor having a first electrode of a principal electrically conducting channel connected to a control electrode of said fourth transistor via a fourth resistance, and a second electrode of said principal electrically conducting channel connected to ground, and a control electrode coupled to receive said second resultant signal; and a sixth transistor having a first electrode of a principal electrically conducting channel providing said second low voltage detection signal and a second electrode of said principal electrically conducting channel connected to ground, and a control electrode connected to said second electrode of said fifth transistor.

20. A low voltage alerting device in a paging receiver having a plurality of operating modes, said device comprising:

voltage supply means for providing an operating voltage for said paging receiver;

voltage detection means for, independently of reception of a paging message, detecting a magnitude of said operating voltage corresponding to one of said plurality of operating modes;

vibrating means for generating a vibration to alert a user of the reception of said paging message during a first of said plurality of operating modes, said vibrating means operating only during said first operating mode;

buzzer means for generating a first audible tone indicative of the reception of said paging message during a second of said plurality of operating modes, and for generating a second audible tone indicative of a transition from said first operating mode to said second operating mode, said first and second audible tones being audibly distinguishable from each other by the user; and said first operating mode indicating that said magnitude of said operating voltage exceeds a first threshold level, said second operating mode indicating that said magnitude of said operating voltage is below said first threshold level and above a second threshold level lower than said first threshold level, said buzzer means turning off during a third operating mode indicating that said magnitude of said operating voltage is below said second threshold level.

21. The device of claim 20, further comprising variable visual display means for providing a visual display indicative of said magnitude of said operating voltage during said transition from said first operating mode to said second operating mode and during said third operating mode.

* * * * *